SELF LOCKING FLEXIBLE GROMMET

Original Filed June 21, 1954 2 Sheets-Sheet 1

INVENTOR.
WALTER H. MOORHEAD
BY
Frank H. Harmon
ATTORNEY

SELF LOCKING FLEXIBLE GROMMET

Original Filed June 21, 1954 2 Sheets-Sheet 2

*INVENTOR.*
WALTER H. MOORHEAD
*BY*
Earl A. Harmon
ATTORNEY

United States Patent Office

Re. 24,438
Reissued Feb. 25, 1958

24,438

SELF LOCKING FLEXIBLE GROMMET

Walter H. Moorhead, Richmond Heights, Ohio

Original No. 2,707,723, dated May 3, 1955, Serial No. 438,286, June 21, 1954. Application for reissue May 1, 1957, Serial No. 657,470

6 Claims. (Cl. 174—153)

Matter enclosed in heavy brackets [ ] appears in the original patent but forms no part of this reissue specification; matter printed in italics indicates the additions made by reissue.

This invention relates to improvements in flexible grommets and is a continuation in part of my invention disclosed in my copending application, Serial No. 177,150, for Flexible Grommet, filed August 2, 1950, now Patent No. 2,690,470, issued September 28, 1954, and has for one of its primary objects to provide a simple, inexpensive and efficient grommet that is universal in its application.

Another object is to provide a grommet that may more readily be inserted and removed, with respect to the wall, or panel, which carries it, and through which it extends, and with respect to the electric cord, or other member, which it carries and which it protects from the wall.

Another object is to provide a flexible hollow grommet with a preformed single end flange and a tapered body which latter may be readily inserted through a hole in the panel, a portion of the bore of the tapered hollow body being less in diameter than the outside diameter of the cable that passes through the grommet in place, the grommet body will not only frictionally grip the cord and roll inwardly upon itself to form another flared end on the other side of the wall and otherwise deform the grommet to enlarge it into a snug fit in the hole in the wall, but will also resiliently lock itself in such position against inadvertent displacement, while allowing manual disengagement from the wall.

With the foregoing and other objects in view, the invention resides in the combination of parts and in the details of construction hereinafter set forth in the following specification and appended claims, certain embodiments thereof being shown in the accompanying drawings, in which:

Figure 2:
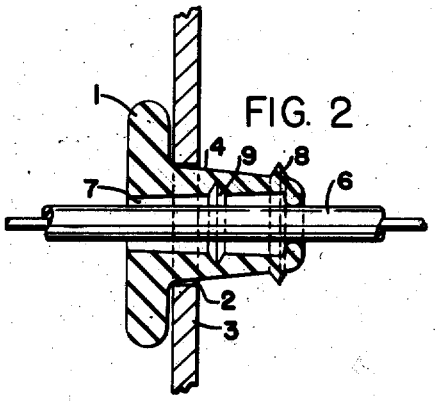
Figure 2 is a similar view of the same type of grommet showing, in side elevation, a cable extending through the hollow grommet.
Figure 3:
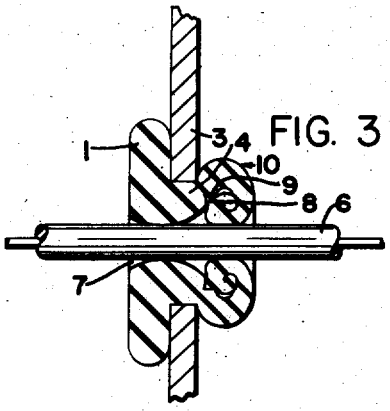
Figure 4:
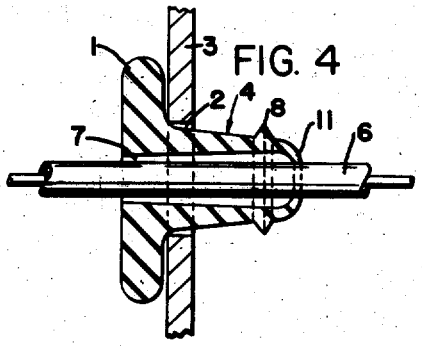
Figure 5:
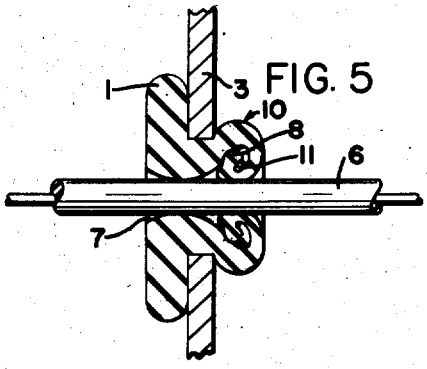
Figure 6:
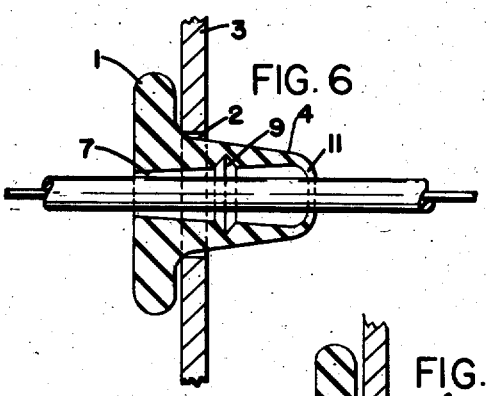
Figure 7:
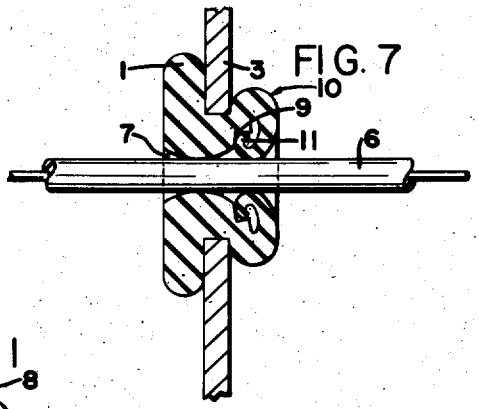
Figure 8:
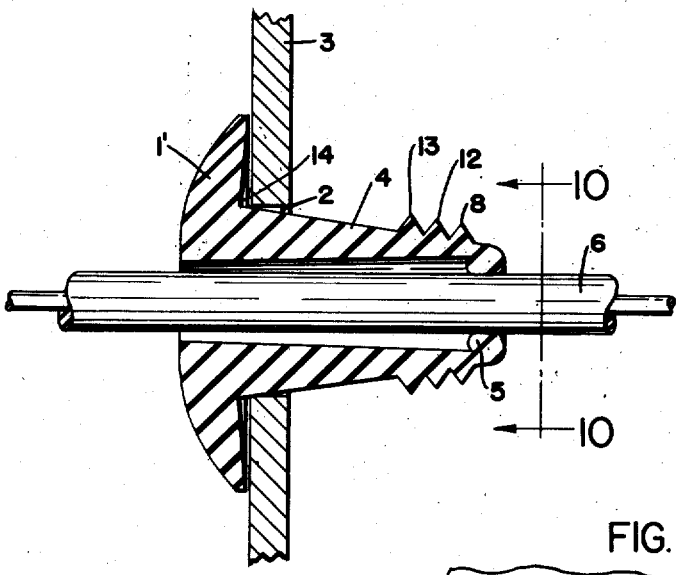
Figure 9:
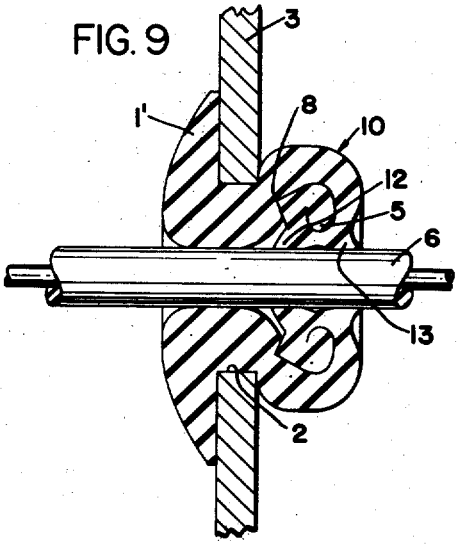
Figure 10:
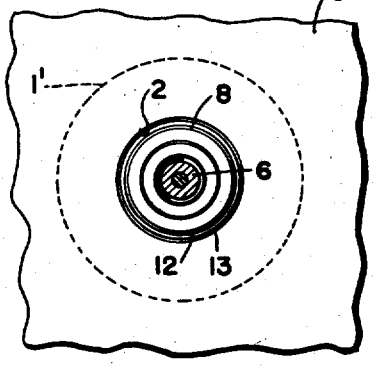

Figure 3 is a similar view, showing the grommet deformed by pulling the cable outwardly toward the wall member, by reason of the gripping relationship between the small end of the grommet with the cable, resulting in the small end of the grommet being rolled inwardly on itself to develop a second grommet head and resiliently locked in such position by reason of an external flange near the small end engaging an internal groove in the grommet body;

Figure 4 is a view similar to Figure 2 of another form of grommet employing only an external flange, and not an internal groove;

Figure 5 is a view similar to Figure 3, showing the small end of the grommet of Figure 4 developed into a second head and locked;

Figure 6 is a view similar to Figures 2 and 4, of another form of grommet employing only an internal groove and not an external flange;

Figure 7 is a view similar to Figures 3 and 5, showing the grommet of Figure 6 developed into a second head and locked;

Figure 8 is a view, generally similar to Figure 2, showing a modified form of my invention, in which I employ a grommet with a preformed flared head having a concave side to oppose the wall member and also additional external flanges on the main body portion of the grommet to effect, not only a resilient locking arrangement, but also additional eternal flanges on the main body portion of the grommet adjacent the small end thereof for assisting the locking arrangement and the gripping of the cord embraced by the grommet;

Figure 9 is a view generally similar to Figure 8, showing the form of grommet shown in Figure 8 when rolled in to form the second grommet head and locked, as shown in Figures 3, 5 and 7; and Figure 10 is a view in section taken along line 10—10 of Figure 8.

In my aforesaid copending application I have disclosed a hollow grommet made of flexible deformable material, such as rubber, or the like, with a single preformed flared head to abut the outer surface of an apertured wall member, while the elongated generally conical body portion extends loosely through the aperture. The small end of the grommet resiliently and frictionally engages a cable, or other elongated member, in such a manner that when the preformed head is held against the outside surface of the wall member the small end of the grommet is rolled inwardly upon itself to form a head in snug engagement with the inside surface of the wall member.

The present invention is directed to an improvement thereon in the form of means built in the grommet whereby it will be self-locking in the position it assumes when the second head is formed against inadvertent displacement, while permitting manual unrolling for removal of the grommet.

Figure 1:
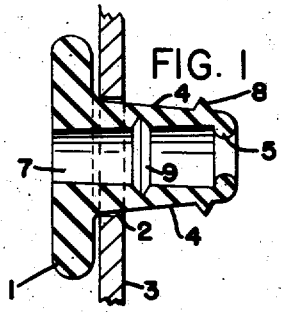
Figure 1 is a view in longiutdinal section taken through one form of grommet extending through an apertured wall member.

In the form shown in Figures 1, 2 and 3, I employ a hollow grommet with a preformed flared head 1 of greater diameter than the aperture 2 in a wall member 3. The elongated hollow body portion 4 of the grommet is generally conical and of such outside diameter to extend through the wall aperture 2. For purposes of illustration, I will consider the left surface, against which the head 1 abuts, as the outside surface of the wall and the opposite, or right, surface the inside surface. The grommet has particular advantages in application where access may not be had to the inside surface of the wall or the interior of a housing enclosed by the wall.

The small end of the body portion 4 is shown to terminate in a radially inwardly extending head 5 of such inside diameter as to be less than the outside diameter of the cable, or other elongated member 6, so as to be slightly distorted as it resiliently and frictionally engages member 6, while the remainder of member 6 extends through the hollow bore 7 of the grommet with appreciable radial clearance.

In addition, I provide an external flange 8 near the small end of the body portion 4 and a correspondingly shaped internal groove 9 formed approximately midway of the length of the grommet.

The flange 8 is of lesser outside diameter than the aperture 2. With the assembly in the position shown in Figure 2, pressure is applied to the head 1 to maintain its position shown while the outside portion of the cable 6 is pulled to the left. Due to the resilient frictional grip of the head 5 on the cable, the grommet is rolled inwardly on itself to assume the shape and position shown in Figure 3 so as to form a new head, indicated at 10. Moreover, due to the shaping and positioning of the flange 8 and groove 9, the flange enters the groove, as shown in Figure 3 to resiliently lock the two together to maintain the head 10 against inadvertent displacement, or unrolling, while permitting the cable to be forcibly pushed, or pulled, in the opposite direction to unroll the head 10, and the grommet to be removed.

In Figure 4, I show another form of grommet in which I have the small end terminate in an inturned lip 11. While I still employ the flange 8 of Figure 2, I may elect not to employ any internal groove, such as shown at 9 in Figure 2. Through the same physical operation, I form the second head and lock it by the compression of the internal surface of the hollow body by the flange 8, as shown in Figure 5.

In Figure 6, I have shown another form of my invention, in which I eliminate the flange 8 of Figures 1 to 5, inclusive, but retain the internal groove 9 of Figures 1 to 3, inclusive. By the same physical operation, the new head 10 is formed and locked in position by the lip 11 engaging the groove 9, as shown in Figure 7.

Thus it will be seen that I have provided an improved grommet which has many advantageous features over the conventional. The conventional flexible grommet contemplates the use of a rubber hollow ring with two preformed flared heads and a short body therebetween. Insertion in a panel hole is difficult because each head is larger than the panel hole and calls for squeezing one head through the hole. Once inserted, the body is invariably of less diameter than the panel hole so as to be loose and subject to inadvertent removal from the panel hole.

This is not the case in my improved grommet. The outside flared head 1 does not change its appearance over the outside head of the conventional two-headed grommet. My grommet is not formed by pulling it through a panel hole so as to wedge it in the hole which would result in an unsightly assembly and make removal difficult. Such a grommet is shown in U. S. Patent No. 2,223,153 of November 26, 1940. My grommet is merely formed by pulling the cable to roll the body of the grommet into an inside flared head, which action also deforms the body into snug engagement with the cable and panel hole, regardless of its shape. However, my grommet is not permanently secured either to the panel nor the cable. Consequently, in order to disassemble, I may merely pull or push the cord from left to right and the resulting action is to unroll the grommet so that the assembly assumes the position of Figures 3, 5 and 7, leaving the grommet free to be easily removed from the cable and the panel.

Moreover, regardless of whether I employ both the flange 8 and internal groove 9 or a flange 8, alone, or groove 9, alone, I am able not only to form the new head 10 on the grommet against an inaccessible internal surface, but to also make the grommet automatically self-locking in such distorted position against inadvertent displacement, or unrolling, while permitting forcible pulling, or pushing, of the cable in the other direction to unroll and remove the grommet from the wall from right to left.

While in Figures 1 to 7, inclusive, I have shown preformed flared grommet heads 1 as having flat sides, I have found it to be expedient to employ preformed flared grommet heads of the type shown at 1' in Figures 8 and 9. Here, the right hand side face of the grommet head adjacent the wall member 3 is concave so that when the second head is developed as shown in Figure 9, by pulling the cord 6 from right to left, a more secure engagement of the right side of the grommet head 1' with the external left face of the wall member 3 is assured, as the space 14 of Figure 8 disappears in Figure 9.

Now, in the interest of enhancing my resilient self-locking feature illustrated and described in connection with Figures 1 to 7, inclusive, I have found it to be expedient, and preferable, to employ, in addition to flange 8, whether in conjunction with bead 5, or lip 11, or in the presence, or absence of internal groove 9, additional flanges 12 and 13, arranged adjacent to and to the left of the small end of the grommet body portion 4. By reference to Figure 9, it will be apparent that when the preformed enlarged grommet head is held in pressure against the external, or left, face of wall member 3, and the cord 6 is pulled from right to left, flange 8, due to the grommet body portion 4 being rolled inwardly upon itself while bead 5 remains in gripping relationship with cord 6, the flange 8 becomes the innermost locking element, flange 12 an intermediate locking element and flange 13 the outer end locking element that resiliently and frictionally engages the cord 6. I have found that the provision of a plurality of such external flanges, whether two, or three or more, materially augments the resilient locking action against inadvertent unrolling, while still permitting manual unrolling by physically pulling the cord from left to right to restore the grommet to the position of Figure 8 for complete removal.

I claim:

1. In combination with a wall member having an aperture therein, a grommet of flexibly deformable material formed to comprise a single preformed enlarged end head and an elongated hollow body portion of lesser size than said preformed enlarged end head and extending to a relatively small end portion that is lesser in outside diameter and in wall thickness to be readily insertable, without deformation, through the aperture in said wall member to leave said preformed single enlarged end head in abutment with one side surface of said wall member, an elongated member slidably extending through said grommet with radial clearance in said preformed enlarged end head and the greater portion of its [tapered] elongated body portion, the smaller end portion only of said grommet being in [resilient and] frictional gripping relationship with said elongated member due solely to the inside [diameter] of said smaller grommet end being normally less than the outside diameter of said elongated *member* [body portion] whereby, upon a manual axial pull on said elongated member in a direction from the smaller end of said grommet toward said preformed large end head while holding the preformed enlarged end head of the grommet in place in abutment against one side surface of said wall member, the hollow body of said grommet, due to the gripping relationship between its smaller end with said elongated member and the *radial* [annular] clearance between the main elongated hollow body portion of said grommet and said elongated member, is rolled inwardly upon itself from said small end, progressively, toward said preformed large end head to form a second enlarged grommet head on the other side of said apertured wall member opposite that of said preformed enlarged end head and the elongated grommet body portion is flexibly deformed into snug engagement with said elongated member and said wall member in the aperture of said wall member, the small end of said grommet having an external portion to engage the internal surface of the grommet at a point in the length of the grommet adjacent the plane of the wall member surface opposite that engaged by the preformed grommet head when said small end is rolled inwardly on itself so as to [resiliently] lock said second grommet head in said position against inadvertent unrolling to become displaced.

2. In combination with a wall member having an aperture therein, a grommet of flexibly deformable material formed to comprise a single preformed enlarged end head and an elongated hollow body portion of lesser size than said preformed enlarged end head and extending to a relatively small end portion that is lesser in outside diameter and in wall thickness to be readily insertable, without deformation, through the aperture in said wall member to leave said preformed single enlarged end head in abutment with one side surface of said wall member, an elongated member slidably extending through said grommet with radial clearance in said preformed enlarged end head and the greater portion of its [tapered] elongated body portion, the smaller end portion only of said grommet being in [resilient and] frictional gripping relationship with said elongated member due solely to the inside [diameter] of said smaller grommet end being normally less than the outside diameter of said elongated *member* [body portion], whereby, upon a manual axial pull on said elongated member in a direction from the smaller end of said grommet toward said preformed large end head while holding the preformed enlarged end head of the grommet in place in abutment against one side surface of said wall member, the hollow body of said grommet, due to the gripping relationship between its smaller end with said elongated member and the *radial* [annular] clearance between the main elongated hollow body portion of said grommet and said elongated member, is rolled inwardly upon itself from said small end, progressively, toward said preformed large end head to form a second enlarged grommet head on the other side of said apertured wall member opposite that of said preformed enlarged end head and the elongated grommet body portion is flexibly deformed into snug engagement with said elongated member and said wall member in the aperture of said wall member, the inner surface of said grommet having a groove disposed in a transverse plane adjacent the wall member surface opposite that engaged by the preformed grommet head when said small end is rolled inwardly on itself, the small end of said grommet having an external portion adapted to engage said internal groove, when said small end is so rolled inwardly on itself, as to [resiliently] lock said second grommet head in said position against inadvertent unrolling to become displaced.

3. In combination with a wall member having an aperture therein, a grommet of flexibly deformable material formed to comprise a single preformed enlarged end head and an elongated hollow body portion of lesser size than said preformed enlarged end head and extending to a relatively small end portion that is lesser in outside diameter and in wall thickness to be readily insertable, without deformation, through the aperture in said wall member to leave said preformed single enlarged end head in abutment with one side surface of said wall member, an elongated member slidably extending through said grommet with radial clearance in said preformed enlarged end head and the greater portion of its [tapered] elongated body portion, the smaller end portion only of said grommet being in [resilient and] frictional gripping relationship with said elongated member due solely to the inside [diameter] of said smaller grommet end being normally less than the outside diameter of said elongated *member* [body portion], whereby, upon a manual axial pull on said elongated member in a direction from the smaller end of said grommet toward said preformed large end head while holding the preformed enlarged end head of the grommet in place in abutment against one side surface of said wall member, the hollow body of said grommet, due to the gripping relationship between its smaller end with said elongated member and the *radial* [annular] clearance between the main elongated hollow body portion of said grommet and said elongated member, is rolled inwardly upon itself from said small end, progressively, toward said preformed large end head to form a second enlarged grommet head on the other side of said apertured wall member opposite that of said preformed enlarged end head and the elongated grommet body portion is flexibly deformed into snug engagement with said elongated member and said wall member in the aperture of said wall member, the small end of said grommet having a plurality of external axially disposed flanges to engage the internal surface of the grommet at points in the length of the grommet adjacent the plane of the wall member surface opposite that engaged by the preformed grommet head when said small end is rolled inwardly on itself and to also engage said elongated member so as to [resiliently] lock said second grommet head in said position against inadvertent unrolling to become displaced.

4. In combination with a wall member having an aperture therein, a grommet of flexibly deformable material formed to comprise a single preformed enlarged end head with a concave surface and an elongated hollow body portion of lesser size than said preformed enlarged end head and extending to a relatively small end portion that is lesser in outside diameter and in wall thickness to be readily insertable, without deformation, through the aperture in said wall member to leave the concave surface of said preformed single enlarged end head in abutment with one side surface of said wall member, an elongated member slidably extending through said grommet with radial clearance in said preformed enlarged end head the greater portion of its [tapered] elongated body portion, the smaller end portion only of said grommet being in [resilient and] frictional gripping relationship with said elongated member due solely to the inside [diameter] of said smaller grommet end being normally less than the outside diameter of said elongated *member* [body portion], whereby, upon a manual axial pull on said elongated member in a direction from the smaller end of said grommet toward said preformed large end head while holding the preformed enlarged end head of the grommet in place in abutment against one side surface of said wall member, the hollow body of said grommet, due to the gripping relationship between its smaller end with said elongated member and the *radial* [annular] clearance between the main elongated hollow body portion of said grommet and said elongated member, is rolled inwardly upon itself from said small end, progressively, toward said preformed large end head to form a second enlarged grommet head on the other side of said apertured wall member opposite that of said preformed enlarged end head and the elongated grommet body portion is flexibly deformed into snug engagement with said elongated member and said wall member in the aperture of said wall member, the inner surface of said grommet having a groove disposed in a transverse plane adjacent the wall member surface opposite that engaged by the preformed grommet head when said small end is rolled inwardly on itself, the small end of said grommet having a plurality of circumferential external axially spaced flanges adjacent its small end to engage said groove in the inner surface of said grommet and said elongated member, when said small end is rolled inwardly on itself, so as to [resiliently] lock said second grommet head in said position against inadvertent unrolling to become displaced.

*5. In combination with a wall member having an aperture therein, a grommet of flexibly deformable material for use as a means for positioning an elongated member within the aperture in said wall member, said grommet being formed to comprise a single preformed enlarged end head and an elongated hollow body portion of lesser size than said preformed enlarged end head and extending to a relatively small end portion that is lesser in outside diameter and in wall thickness to be readily insertable, without deformation, through the aperture in said wall member to leave said preformed single enlarged end head in abutment with one side surface of said wall member, said elongated member slidably extending through said grommet with radial clearance in said preformed enlarged end head and the greater portion of its elongated body portion, the smaller end portion only of said grommet being in frictional gripping relationship with said elongated member due solely to the inside of said smaller grommet end being normally less than the outside diameter of said elongated member, whereby, upon a manual axial pull on said elongated member in a direction from the smaller end of said grommet toward said preformed large end head while holding the preformed enlarged end head of the grommet in place in abutment*

*against one side surface of said wall member, the hollow body of said grommet, due to the gripping relationship between its smaller end with said elongated member and the radial clearance between the main elongated hollow body portion of said grommet and said elongated member, is rolled inwardly upon itself from said small end, progressively, toward said preformed large end head to form a second enlarged grommet head on the other side of said apertured wall member opposite that of said preformed enlarged end head and the elongated grommet body portion is flexibly deformed into snug engagement with said elongated member and said wall member in the aperture of said wall member, the small end of said grommet having an external portion to engage the internal surface of the grommet at a point in the length of the grommet adjacent the plane of the wall member surface opposite that engaged by the preformed grommet head when said small end is rolled inwardly on itself so as to lock said second grommet head in said position against inadvertent unrolling to become displaced.*

*6. In combination with a wall member having an aperture therein, a grommet of flexibly deformable material for use as a means for positioning an elongated member within the aperture in said wall member, said grommet being formed to comprise a single preformed enlarged end head with a concave surface and an elongated hollow body portion of lesser size than said preformed enlarged end head and extending to a relatively small end portion that is lesser in outside diameter and in wall thickness to be readily insertable, without deformation, through the aperture in said wall member to leave the concave surface of said preformed single enlarged end head in*

*abutment with one side surface of said wall member, said elongated member slidably extending through said grommet with radial clearance in said preformed enlarged end head and the greater portion of its elongated body portion, the smaller end portion only of said grommet being in frictional gripping relationship with said elongated member due solely to the inside of said smaller grommet end being normally less than the outside diameter of said elongated member, whereby, upon a manual axial pull on said elongated member in a direction from the smaller end of said grommet toward said preformed large end head while holding the preformed enlarged end head of the grommet in place in abutment against one side surface of said wall member, the hollow body of said grommet, due to the gripping relationship between its smaller end with said elongated member and the radial clearance between the main elongated hollow body portion of said grommet and said elongated member, is rolled inwardly upon itself from said small end, progressively, toward said preformed large end head to form a second enlarged grommet head on the other side of said apertured wall member opposite that of said preformed enlarged end head and the elongated grommet body portion is flexibly deformed into snug engagement with said elongated member and said wall member in the aperture of said wall member, and, at the same time, the concave surface of the single preformed enlarged end head is deformed into generally flush engagement with the said one side surface of the wall member.*

No references cited.